United States Patent
Saitsu (10) Patent No.: US 9,503,646 B2
(45) Date of Patent: Nov. 22, 2016

(54) IMAGE BLUR CORRECTION APPARATUS, OPTICAL APPARATUS, AND METHOD THEREOF

(71) Applicant: CANON KABUSHIKI KAISHA, Tokyo (JP)

(72) Inventor: Kenji Saitsu, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 48 days.

(21) Appl. No.: 14/677,444

(22) Filed: Apr. 2, 2015

(65) Prior Publication Data

US 2015/0215539 A1 Jul. 30, 2015

Related U.S. Application Data

(62) Division of application No. 13/616,690, filed on Sep. 14, 2012, now Pat. No. 9,392,172.

(30) Foreign Application Priority Data

Oct. 13, 2011 (JP) .................................. 2011-225422

(51) Int. Cl.
*H04N 5/232* (2006.01)
*G03B 5/00* (2006.01)
*G06T 5/00* (2006.01)

(52) U.S. Cl.
CPC ............ *H04N 5/23267* (2013.01); *G03B 5/00* (2013.01); *G06T 5/003* (2013.01);
(Continued)

(58) Field of Classification Search
None
See application file for complete search history.

(56) References Cited

U.S. PATENT DOCUMENTS 5,572,252 A 11/1996 Naka et al.
8,743,218 B2 * 6/2014 Tsuchida .................. G03B 5/00
348/208.2

(Continued)

FOREIGN PATENT DOCUMENTS

JP 2007130172 A 5/2007
JP 2008288840 A 11/2008
(Continued)

OTHER PUBLICATIONS

Office Action issued in JP2011-225422, mailed Nov. 11, 2014.
(Continued)

*Primary Examiner* — Timothy J Henn
*Assistant Examiner* — Quan Pham
(74) *Attorney, Agent, or Firm* — Rossi, Kimms & McDowell LLP (57) ABSTRACT

An image blur correction apparatus includes an shooting state detecting portion that determines a shooting state of a first shooting state or a second shooting state based on an angular velocity signal, and a controller that performs an image blur correction using characteristics depending on a determination result of the shooting state determining portion, and the shooting state determining portion determines that the first shooting state has started when the angular velocity signal exceeds a first threshold value and exceeds a second threshold value having an opposite sign of the first threshold value within a predetermined time after exceeding the first threshold value, and determines that the first shooting state is continuously maintained when the angular velocity signal exceeds a third threshold value and exceeds a fourth threshold value that has an opposite sign of the third threshold value within the predetermined time after exceeding the third threshold value.

7 Claims, 9 Drawing Sheets

(52) U.S. Cl.
CPC ..... *H04N 5/23258* (2013.01); *H04N 5/23287* (2013.01); *G03B 2217/005* (2013.01); *G06T 2207/20201* (2013.01)

(56) References Cited

U.S. PATENT DOCUMENTS

| | | |
|---|---|---|
| 2005/0254805 A1 | 11/2005 | Moriya et al. |
| 2006/0176366 A1* | 8/2006 | Moriya .................. G03B 17/00 348/64 |
| 2008/0027601 A1 | 1/2008 | Sewaki |
| 2010/0149351 A1 | 6/2010 | Tanaka |
| 2010/0150537 A1 | 6/2010 | Tsuchihashi |
| 2010/0158493 A1 | 6/2010 | Miyasako |
| 2010/0208088 A1 | 8/2010 | Nakai et al. |
| 2011/0013031 A1 | 1/2011 | Miyasako |
| 2011/0025982 A1 | 2/2011 | Takahashi |
| 2011/0105957 A1 | 5/2011 | Kourogi et al. |
| 2011/0194847 A1 | 8/2011 | Wakamatsu |

FOREIGN PATENT DOCUMENTS

| | | |
|---|---|---|
| JP | 2009258130 A | 11/2009 |
| JP | 2010139694 A | 6/2010 |
| JP | 2010277033 A | 12/2010 |
| JP | 2011145354 A | 7/2011 |
| JP | 2011164227 A | 8/2011 |

OTHER PUBLICATIONS

Office Action issued in U.S. Appl. No. 13/616,690, mailed Dec. 3, 2014.

Notice of Allowance issued in U.S. Appl. No. 13/616,690, mailed Mar. 25, 2016.

* cited by examiner

IMAGE BLUR CORRECTION APPARATUS, OPTICAL APPARATUS, AND METHOD THEREOF

BACKGROUND OF THE INVENTION

1. Field of the Invention

The present invention relates to an image blur correction apparatus that performs an image blurring correction using characteristics depending on a shooting state.

2. Description of the Related Art

A previous image blur correction apparatus has a prism or a lens member capable of displacing an optical axis that is disposed in an optical path of incident light into an image pickup element, and displacing the optical axis in accordance with a hand shake so as to perform an image blur correction. In the image blur correction apparatus, a correctable angle of the optical axis by a correction lens in a case where a zoom position is located at a telephoto side is larger than that in a case where the zoom position is located at a wide-angle side. On condition that amounts of correction by the correction lens are equal to each other, the correction angle by the correction lens at the telephoto side is larger than that at the wide-angle side.

Japanese Patent Laid-Open No. 2010-139694 discloses a blur correction apparatus that includes a vibration detector that detect s a vibration so as to output its detected signal and that release the limit of a lens driving range when the detected signal is larger than a predetermined level so as to widen the lens driving range. The vibration detector of Japanese Patent Laid-Open No. 2010-139694 determines that the detected signal is larger than the predetermined level using a ratio in which the detected signal exceeds a certain threshold value or the number of times by which the detected signal exceeds a certain threshold value in a unit time.

However, an amount of the hand shake is not always constant, and also characteristics of the shake (vibration) are varied in accordance with a user. In particular, when a shooting state is a state of shooting while walking where a shooting is performed while walking, the user often takes an image while confirming a shot image. In this case, some users unconsciously behave so as to absorb the hand shake when the state of shooting while walking is maintained for a while, and therefore the amount of the shake (image blur) may be temporarily reduced by the behavior. Accordingly, when the determination is performed only by using the amount of the shake (the image blur), there is a case in which the image blur correction in the state of shooting while walking is stopped in spite of the state of shooting while walking, and it is difficult to perform the image blur correction with high accuracy.

SUMMARY OF THE INVENTION

The present invention provides an image blur correction apparatus that performs an image blurring correction using characteristics depending on a shooting state so as to improve detection accuracy of the shooting state. The present invention also provides an optical apparatus that has the image blur correction apparatus.

An image blur correction apparatus as one aspect of the present invention includes an shooting state detecting portion configured to determine a shooting state of one of a first shooting state and a second shooting state based on an angular velocity signal, and a controller configured to perform an image blur correction using characteristics depending on a determination result of the shooting state determining portion. The shooting state determining portion determines that the first shooting state has started when the angular velocity signal exceeds a first threshold value and exceeds a second threshold value having an opposite sign of the first threshold value within a predetermined time after exceeding the first threshold value, determines that the first shooting state is continuously maintained when the angular velocity signal exceeds a third threshold value smaller than the first threshold value and exceeds a fourth threshold value that has an opposite sign of the third threshold value and that is smaller than the second threshold value within the predetermined time after exceeding the third threshold value on condition that the shooting state is the first shooting state, and determines that the first shooting state has ended when the angular velocity signal does not exceed the third threshold value, or does not exceed the fourth threshold value within the predetermined time after exceeding the third threshold value on condition that the shooting state is the first shooting state.

An image blur correction apparatus as another aspect of the present invention includes an shooting state detecting portion configured to determine a shooting state of one of a first shooting state and a second shooting state based on an angular velocity signal, and a controller configured to perform an image blur correction using characteristics depending on a determination result of the shooting state determining portion. The shooting state determining portion determines that the first shooting state has started when the angular velocity signal exceeds a first threshold value and exceeds a second threshold value having an opposite sign of the first threshold value within a first time after exceeding the first threshold value, determines that the first shooting state is continuously maintained when the angular velocity signal exceeds a third threshold value and exceeds a fourth threshold value that has an opposite sign of the third threshold value within a second time longer than the first time after exceeding the third threshold value on condition that the shooting state is the first shooting state, and determines that the first shooting state has ended when the angular velocity signal does not exceed the third threshold value, or does not exceed the fourth threshold value within the second time after exceeding the third threshold value on condition that the shooting state is the first shooting state.

An optical apparatus as another aspect of the present invention includes the image blur correction apparatus.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

First Embodiment

Figure 1:
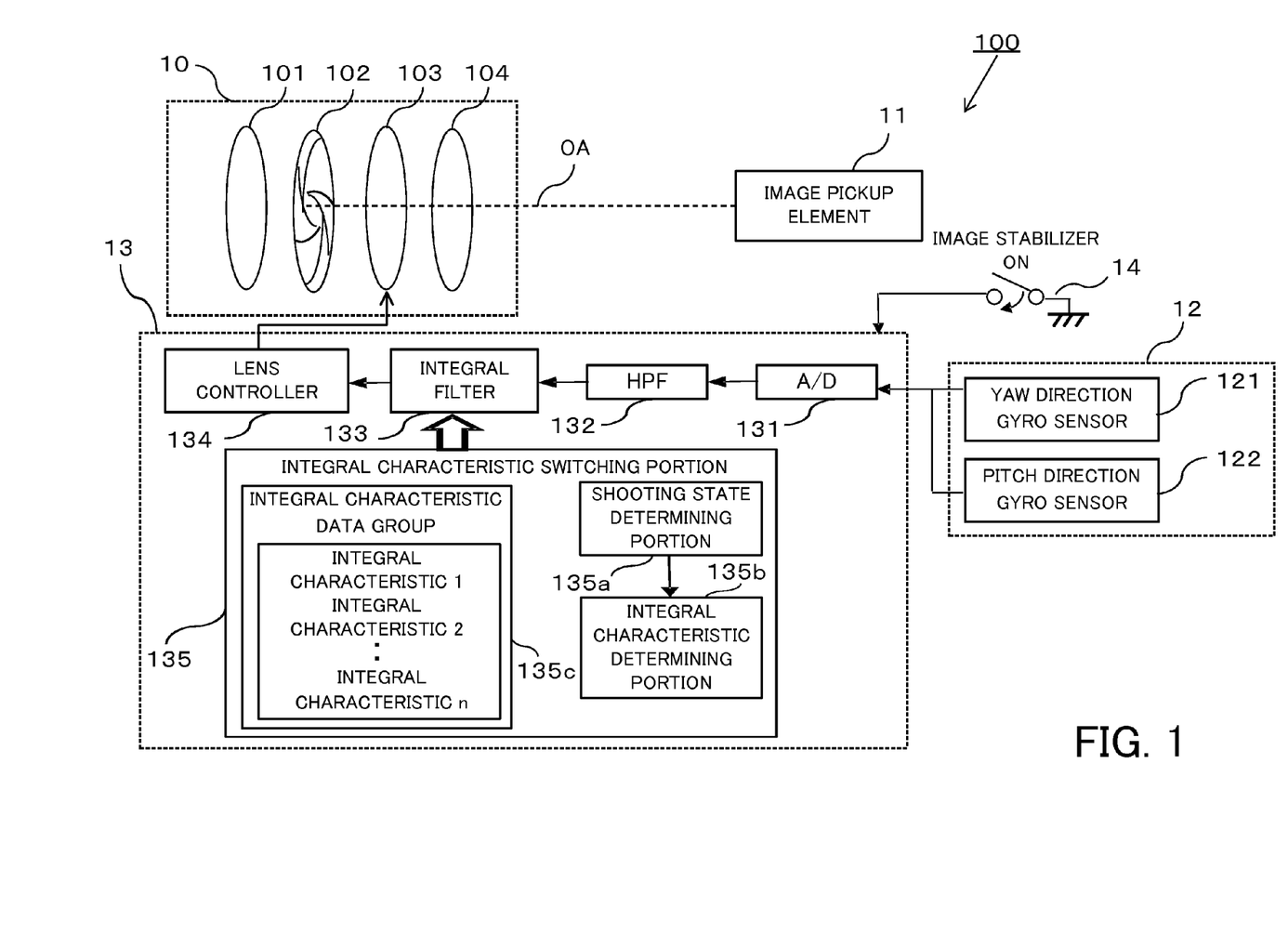
FIG. 1 is a block diagram of an image pickup apparatus (an optical apparatus) that includes an image blur correction apparatus in the present embodiment.

First of all, a configuration of an image blur correction apparatus in a first embodiment of the present invention will be described. FIG. 1 is a block diagram of an image pickup apparatus 100 (an optical apparatus such as a camera or a video camera) that includes an image blur correction apparatus 13 in the present embodiment. The image pickup apparatus 100 can perform an image blur correction by moving a shift lens for correcting a hand shake in a direction orthogonal to an optical axis OA (an orthogonal direction of the optical axis).

Reference numeral 10 denotes a lens unit (a lens barrel) that has a configuration of an inner focus type. The lens unit 10 is configured by including a zoom lens 101, a stop 102, a shift lens 103, and a focus lens 104. Light passing through the lens unit 10 is imaged on an image pickup element 11 such as a CCD or a CMOS. The lens unit 10 has the configuration of the inner focus type, but the present embodiment is not limited to this and can also be applied to a lens unit which has a configuration of a rear focus type. In addition, the present embodiment can be applied to both cases where the image pickup apparatus 100 is integrally configured by the lens unit 10 and an image pickup apparatus body (a camera body) and the lens unit 10 is configured so as to be interchangeable with respect to the image pickup apparatus body.

Reference numeral 12 denotes a gyro sensor (an image blur detection sensor) that detects an angular velocity signal (an image blur) of the image pickup apparatus 100. The gyro sensor 12 is configured by including a yaw direction gyro sensor 121 that detects an angular velocity signal in a yaw direction and a pitch direction gyro sensor 122 that detects an angular velocity signal in a pitch direction. However, the present embodiment is not limited to this, and one gyro sensor that is capable of detecting angular velocity signals in two-axis or three-axis directions may also be used.

Reference numeral 13 denotes an image blur correction apparatus. The image blur correction apparatus 13 is configured by including an A/D converter 131, a high-pass filter 132 (HPF), an integral filter 133, a lens controller 134 (a controller), and an integral characteristic switching portion 135. The image blur correction apparatus 13 performs a predetermined processing for an angular velocity signal that is detected by the gyro sensor 12 so as to generate a signal for driving the shift lens 103 in the direction orthogonal to the optical axis. In the present embodiment, the image blur correction apparatus 13 drives the shift lens 103, but the present embodiment is not limited to this and it can also be configured so as to drive the image pickup element 11 in the direction orthogonal to the optical axis.

Reference numeral 14 denotes a switch portion. The switch portion 14 is operated so that whether the image blur correction is performed or not (on/off of an image stabilization function) can be selected. The switch portion 14 is not limited to a switch portion which selects whether the image blur correction is performed or not, and it may also be configured so that the control of the image blur correction is changed by switching the switch portion 14.

Next, a flow of a signal processing that is performed by the image blur correction apparatus 13 will be described. First of all, the angular velocity signal (an analog signal) that is obtained by the gyro sensor 12 is converted into a digital signal by the A/D converter 131. Subsequently, the digitalized angular velocity signal passes through the high-pass filter 132 so as to obtain an angular velocity signal in which DC components (low frequency components) have been cut.

The integral characteristic switching portion 135 is configured by including a shooting state determining portion 135a (a shooting state determining unit), an integral characteristic determining portion 135b, and an integral characteristic data group 135c. The shooting state determining portion 135a recognizes amplitude or a frequency of the vibration (the hand shake) or the like based on the angular velocity signal that has passed the high-pass filter 132 so as to determine a current shooting state. In the present embodiment, the shooting state determining portion 135a determines whether the state is a state of shooting while walking (a first shooting state) or a state of shooting at rest (a second shooting state), but the present embodiment is not limited to this. For example, a state of shooting on a vehicle may be set as a first shooting state, and another shooting state can also be arbitrarily added.

The integral characteristic determining portion 135b determines integral characteristics that are applied to the integral filter 133 in accordance with a determination result of the shooting state determining portion 135a. The integral characteristic switching portion 135 stores the integral characteristic data group 135c that has a plurality of integral characteristics (integral characteristics 1, 2, . . . , n) so that a specific integral characteristic is selected from among the integral characteristics of the integral characteristic data group 135c.

When the integral characteristic suitable for the current shooting state is selected by the integral characteristic switching portion 135, the angular velocity signal passes through the integral filter 133 to which its integral characteristic is applied so as to be changed to an angular displacement signal. The lens controller 134 uses the angular displacement signal obtained by passing through the integral filter 133 so as to move the shift lens 103 in the yaw direction and the pitch direction that are the directions orthogonal to the optical axis, in a direction opposite to a moving direction of the image pickup apparatus 100 caused by the vibration (the hand shake). In other words, the lens controller 134 performs the image blur correction using the characteristics (the integral characteristics) depending on the determination result obtained by the shooting state determining portion 135a. Thus, since the image blur correction apparatus 13 of the present embodiment includes the integral characteristic switching portion 135, it can determine the current shooting state so as to perform the image blur correction control which is suitable for its shooting state.

Figure 2A:
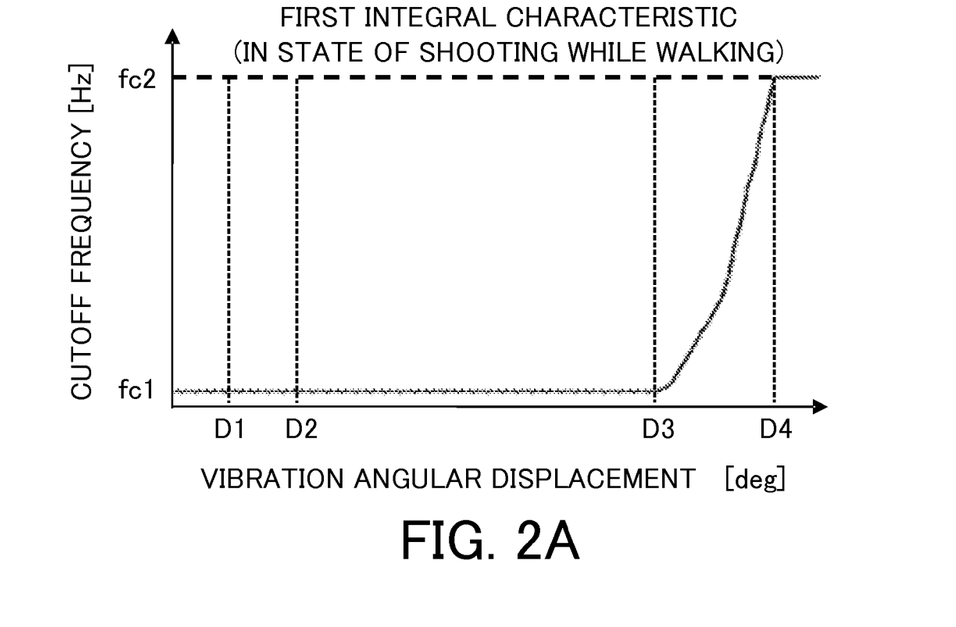
FIGS. 2A and 2B are diagrams of illustrating integral characteristics of the image blur correction apparatus in the present embodiment.
Figure 2B:
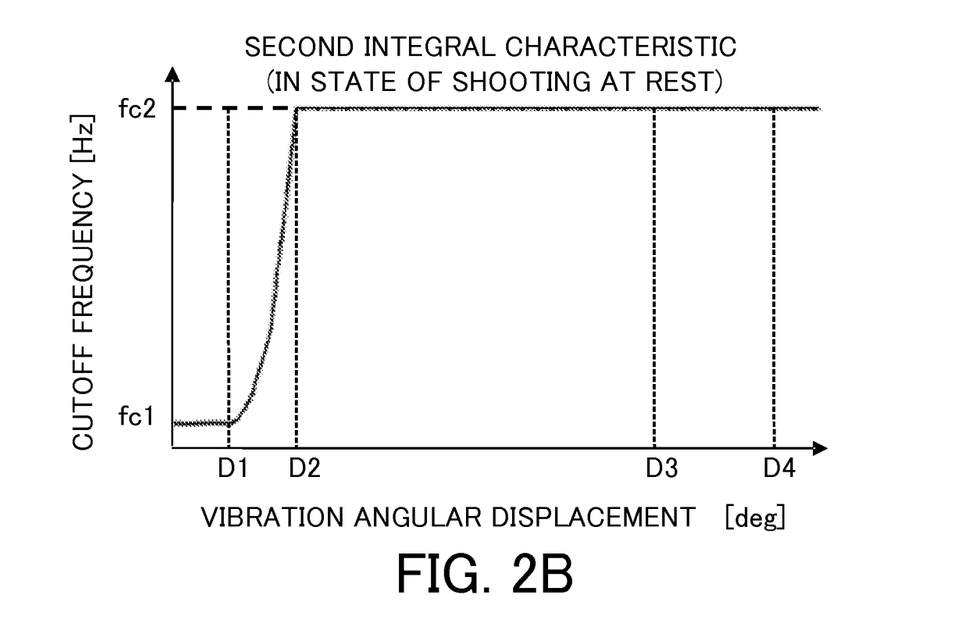

Next, how the drive of the shift lens 103 is changed in accordance with the integral characteristics will be described. FIGS. 2A and 2B are diagrams of illustrating the integral characteristics of the image blur correction apparatus 13 in the present embodiment, and FIGS. 2A and 2B illustrate first integral characteristics (a state of shooting while walking) and second integral characteristics (a state of shooting at rest), respectively.

Both the first integral characteristics and the second integral characteristics are integral characteristics that have a minimum cutoff frequency fc1 and a maximum cutoff frequency fc2. In the first integral characteristics, the cutoff frequency is gradually heightened when a vibration angular displacement that represents the extent of the vibration exceeds D3, and the cutoff frequency reaches the maximum cutoff frequency fc2 when the vibration angular displacement is D4. On the other hand, in the second integral characteristics, the cutoff frequency is gradually heightened when the vibration angular displacement exceeds D1, and the cutoff frequency reaches the maximum cutoff frequency fc2 when the vibration angular displacement is D2. In other words, the second integral characteristics are integral characteristics that enlarge a lens centripetal force (narrow an image blur correction range) even for a small vibration (a small hand shake) such as a vibration angular displacement D2. On the other hand, the first integral characteristics are integral characteristics that reduce the lens centripetal force (widen the image blur correction range) for the small vibration.

The lens centripetal force means a force that sends the shift lens 103 to a center of the optical axis with respect to the vibration. In other words, when a lens driving limit range on a mechanical stroke is constant, the lens driving range (the image blur correction range) is widened as the lens centripetal force is decreased. As illustrated in FIGS. 2A and 2B, the second integral characteristics are characteristics in which the cutoff frequency (the lens centripetal force) is high (strong) even in a small vibration angular displacement. In other words, it is integral characteristics that have a narrow lens driving range. On the other hand, the first integral characteristics are characteristics in which the cutoff frequency (the lens centripetal force) is low (weak) up to a large vibration angular displacement. In other words, it is integral characteristics that have a wide lens driving range so as to correct a large amount of image blur.

Thus, in the present embodiment, a plurality of different integral characteristics are previously stored and the integral characteristics are switched in accordance with the shooting state, i.e. the characteristics are switched so as to widen the range of the image blur correction in the first shooting state compared to the second shooting state, so as to change the lens driving range. For example, when it is determined that a current shooting state is the state of shooting while walking (the first shooting state), the integral characteristic switching portion 135 is set so as to select the first integral characteristics of FIG. 2A. On the other hand, when it is determined that the current shooting state is the state of shooting at rest (the second shooting state), the integral characteristic switching port ion 135 is set so as to select the second integral characteristics of FIG. 2B. In such a configuration, the lens driving range (the image blur correction range) during shooting while walking is wider than that during shooting at rest, and therefore a large amount of image blur that is generated during shooting while walking can also be corrected. As a result, an image blur correction which is suitable for the current shooting state can be performed.

In the present embodiment, the image blur correction control that sets different integral characteristics in accordance with the shooting state so as to change the lens driving range is described, but the image blur correction control is not limited to a configuration in which the integral characteristics are changed. For example, when it is determined that the current shooting state is during panning or tilting, it may also be changed so as to perform a control independent of the integral characteristics such as fixing the lens at a center position of the optical axis.

Figure 3:
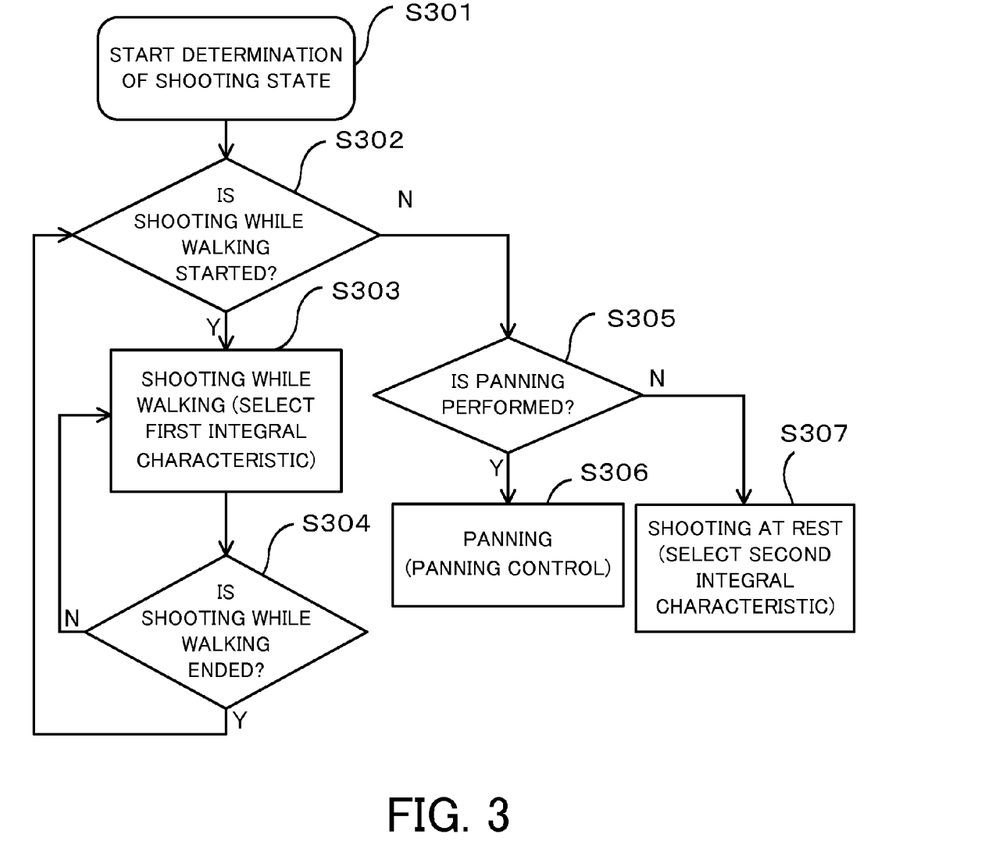
FIG. 3 is a flowchart of illustrating an operation of a shooting state determining portion in the present embodiment.

Next, referring to FIG. 3, the operation of the shooting state determining portion 135a in the present embodiment is described. FIG. 3 is a flowchart of illustrating the operation of the shooting state determining portion 135a in the present embodiment. The shooting state determining portion 135a determines the shooting state using the angular velocity signal that is obtained by passing through the high-pass filter 132. The angular velocity signal after passing through the high-pass filter 132 is used because an offset component caused by a hand shake, i.e. the offset component close to the DC component, needs to be removed. According to such a configuration, a higher accuracy shooting state determination can be performed.

When the shooting state determination is started by the shooting state determining portion 135a in Step S301 of FIG. 3, first of all in Step 302, the determination whether the shooting while walking is started or not is performed. When the shooting state determining portion 135a determines that the current shooting state is the state of shooting while walking, it selects the first integral characteristics in Step S303 so as to widen the lens driving range. Then, it continuously maintains the state in which the lens driving range is widened (the state in which the first integral characteristics are selected) while determining the state of shooting while walking. Then, in Step S304, the shooting state determining portion 135a determines whether the state of shooting while walking has ended. When it is determined that the state of shooting while walking is ended in Step S304, the flow returns to Step S302, and a determination of start of shooting while walking is performed.

When it is determined that the shooting while walking is not started in Step S302, the flow proceeds to Step S305. In Step S305, the shooting state determining portion 135a determines whether a panning is performed or not. When it is determined that the panning is performed, the flow proceeds to Step S306 and the panning control is performed. On the other hand, when the shooting state determining portion 135a determines that the panning is not performed in Step S305, the flow proceeds to Step S307 and it determines that the current shooting state is a state of shooting at rest. In this case, the second integral characteristics are selected so as to perform the image blur correction within the narrow lens driving range.

Figure 4:
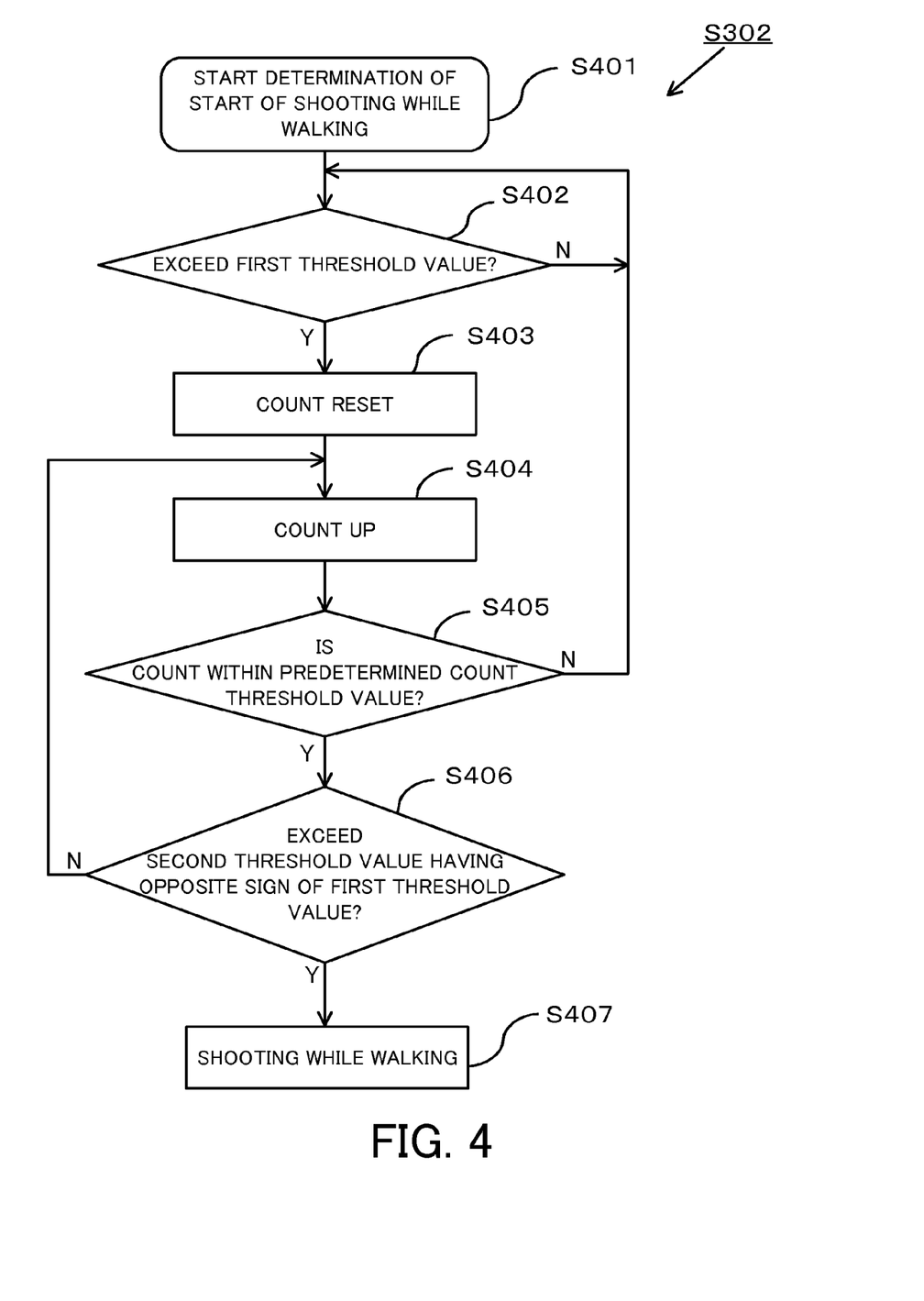
FIG. 4 is a flowchart of determining start of shooting while walking in the first embodiment.

Next, referring to FIG. 4, a determination of start of shooting while walking in the present embodiment is described in detail. FIG. 4 is a flowchart of the determination of start of shooting while walking in the present embodiment. The determination of start of shooting while walking illustrated in FIG. 4 corresponds to Step S302 in FIG. 3, which is performed by the shooting state determining portion 135a.

When the determination of start of shooting while walking is started in Step S401, it is determined whether the angular velocity signal exceeds a first threshold value (an absolute value) or not in Step S402. This determination process is repeated until the angular velocity signal exceeds the first threshold value. When it is determined that the angular velocity signal exceeds the first threshold value, a count reset and a count up are performed in Steps S403 and S404, respectively. Subsequently, it is determined whether the count is within a predetermined count threshold value (within a predetermined time after the signal exceeds the first threshold value) in Step S405. When the count is within the predetermined count threshold value, the flow proceeds to Step S406.

In Step S406, whether the angular velocity signal exceeds a second threshold value (an absolute value) that has an opposite sign of the first threshold value is determined. The absolute values of the first threshold value and the second threshold value may be equal to each other, or alternatively they may be different from each other. When the angular velocity signal does not exceed the second threshold value (the absolute value) in Step S406, a loop of Steps S404, S405, and S406 is repeated. On the other hand, the angular velocity signal exceeds the second threshold value in Step S406, it is determined that the current shooting state is the state of shooting while walking in Step S407. When the count exceeds a predetermined count threshold value during the loop of Steps S404 to S406 (in Step S405), the flow returns to Step S402.

Figure 5:
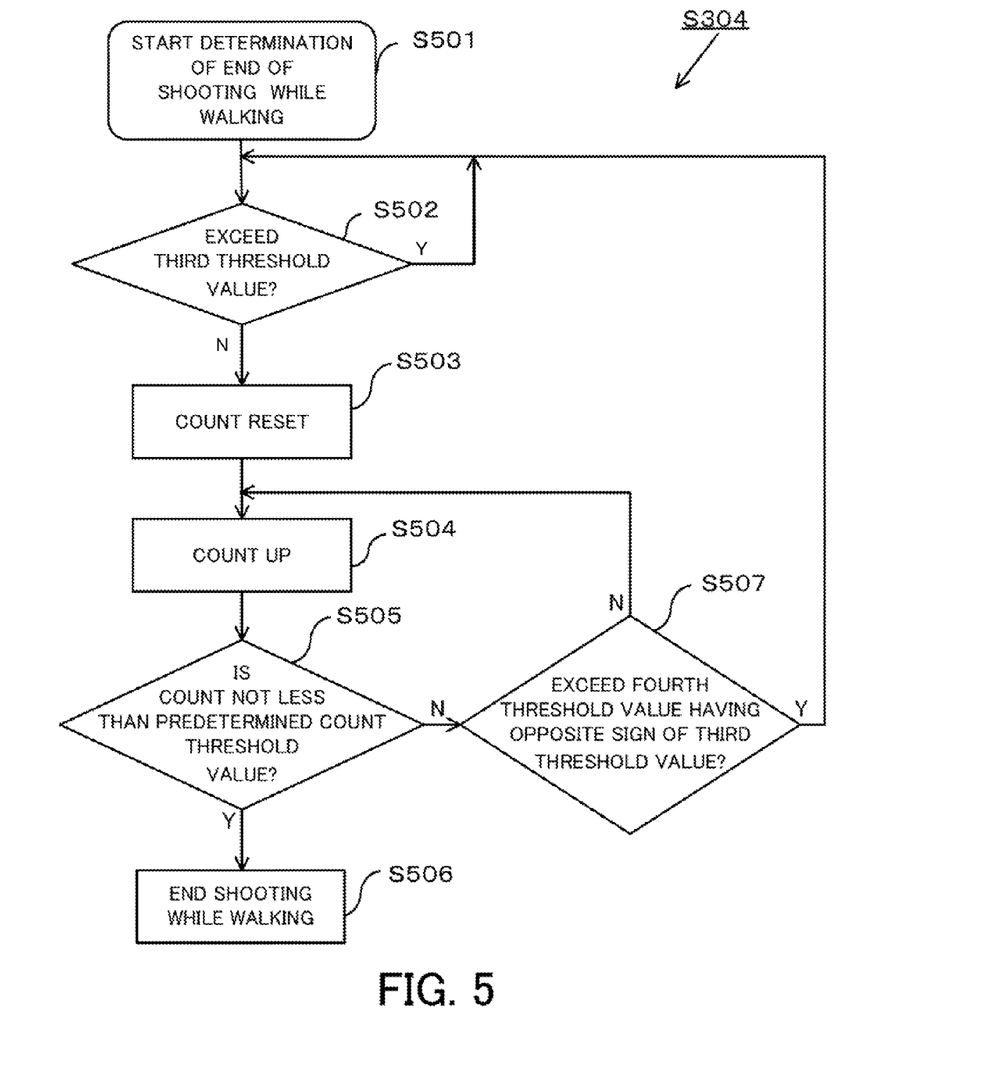
FIG. 5 is a flowchart of determining end of shooting while walking in the first embodiment.

Next, referring to FIG. 5, a determination of end of shooting while walking in the present embodiment is described in detail. FIG. 5 is a flowchart of the determination of end of shooting while walking in the present embodiment. The determination of end of shooting while walking illustrated in FIG. 5 corresponds to Step S304 of FIG. 3, which is performed by the shooting state determining portion 135a.

In the state of shooting while walking, when the determination of end of shooting while walking is started in Step S501, it is determined whether the angular velocity signal exceeds a third threshold value in Step S502. In the present embodiment, the third threshold value (the absolute value) is set so as to be smaller than the first threshold value (the absolute value) that is used for the determination of start of shooting while walking. This determination process is repeated (Y in Step S502) until the angular velocity signal does not exceed the third threshold value (N in Step S502). When the angular velocity signal does not exceed the third threshold value, the flow proceeds to Step S503, where the count reset and the count up are performed in Steps S503 and S504, respectively. Subsequently, it is determined whether the count is not less than a predetermined count threshold value (not less than a first predetermined time ΔT after the angular velocity signal exceeds the third threshold value) in Step S505.

When the count is within the predetermined threshold value (within the predetermined time after the signal exceeds the third threshold value) in Step S505, a loop of Steps S507, S504, and S505 is repeated until the angular velocity signal is determined to exceed a fourth threshold value (an absolute value) of an opposite sign of the third threshold value in Step S507. On the other hand, when the count is not less than the predetermined threshold value in Step S505, the flow proceeds to Step S506, where it is determined that the shooting while walking has ended. When it is determined that the angular velocity signal exceeds the fourth threshold value (an absolute value) of an opposite sign of the third threshold value in Step S507 during the loop of Steps S507, S504, and S505, the flow returns to Step S502. In the present embodiment, the fourth threshold value (the absolute value) is set to be smaller than the second threshold value (the absolute value). The absolute values of the third threshold value and the fourth threshold value may be equal to each other, or alternatively they may be different from each other.

As described above, using the flows described with reference to FIGS. 4 and 5, the start of shooting while walking and the end of shooting while walking can be determined with high accuracy. In the present embodiment, a determination reference of the end of shooting while walking is set more strictly than a determination reference of the start of shooting while walking. Therefore, even when a user unconsciously behaves so as to absorb the hand shake, the determination of shooting while walking is not easily removed and a high accuracy control can be performed.

Figure 6:
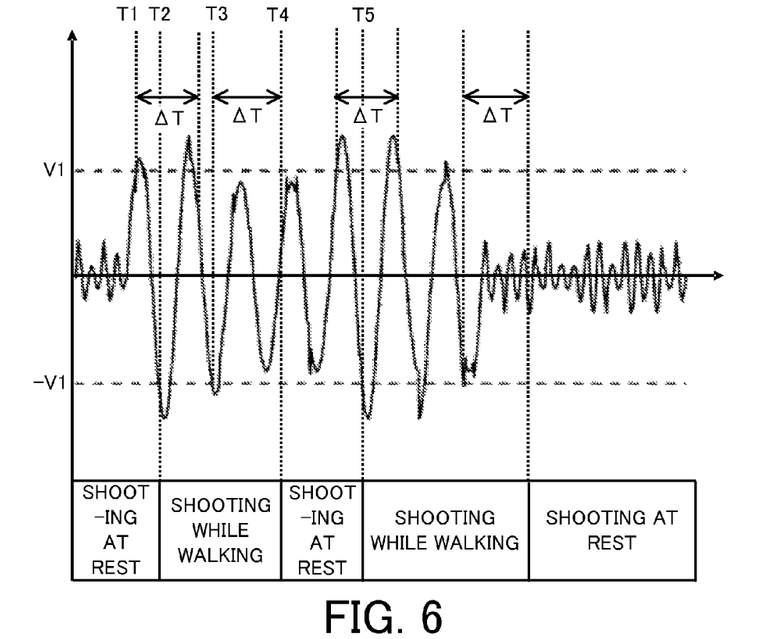
FIG. 6 is a vibration detection result as a comparative example with respect to the first embodiment.

Next, referring to FIG. 6, a vibration detection result in a case where the threshold values of the angular velocity signal that are used for the determinations of the start of shooting while walking and the end of shooting while walking are set to be a value equal to each other will be described. FIG. 6 is the vibration detection result as a comparative example with respect to the present embodiment. This comparative example is a detection result in a case where the behavior of absorbing the hand shake that is unconsciously performed by the user does not care (in a case where the present embodiment is not applied). A waveform illustrated in FIG. 6 is a waveform that indicates an angular velocity signal in the state of shooting at rest (a common hand shake) to move to the state of shooting while walking, and then to return to the state of shooting at rest. The first threshold value, the second threshold value, and a time threshold value (the predetermined time) of the angular velocity signal is indicated as V1, −V1, and ΔT, respectively, and FIG. 6 also indicates the determined shooting state under the waveform.

When viewing the waveform in accordance with the flow of the time, first of all, a vibration not less than the first threshold value V1 is detected at the time T1, and a vibration not more than the second threshold value −V1 (not less than the threshold value of the second threshold value) is detected at the time T2. Since the time period from the time T1 to the time T2 is within the time threshold value ΔT, it is determined that the state is in shooting while walking. However, since the user unconsciously behaves so as to absorb the hand shake (the vibration), then the amplitude of the shake is temporarily decreased. Therefore, after the vibration not more than the second threshold value −V1 (not less than the absolute value of the second threshold value) at the time T3, a vibration not less than the first threshold value V1 cannot be detected by a time T4 that is within the time threshold value ΔT, and therefore it is erroneously determined that the state is in shooting at rest in spite of the shooting at rest. Then, a condition of determining the start of shooting while walking is met at a time T5 and therefore it is determined that the state is in shooting while walking again, but the image blur correction control in shooting while walking cannot be performed during the time T4 to time T5. Therefore, there is high possibility that a large amount of blur (shake) is generated on a screen.

Figure 7:
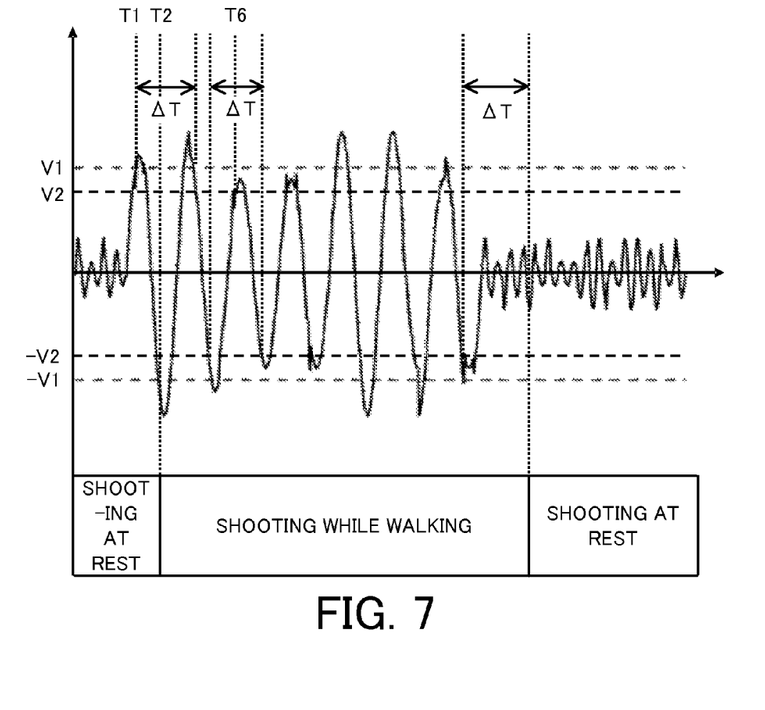
FIG. 7 is a vibration detection result in the first embodiment.

Next, referring to FIG. 7, the a vibration detection result in a case where the threshold values (the third threshold value and the fourth threshold value) of the angular velocity signal that are used for the determination of the end of shooting while walking are smaller than the threshold values (the first threshold value and the second threshold value) of the angular velocity signal that are used for the determination of the start of shooting while walking will be described. FIG. 7 is a vibration detection result in the present embodiment. A waveform illustrated in FIG. 7 is the same as the waveform illustrated in FIG. 6. The first threshold value and the second threshold value that are used for the determination of the start of shooting while walking are indicated as V1 and −V1 respectively, the third threshold value and the fourth threshold value that are used for the determination of the end of shooting while walking are indicated as V2 and −V2 respectively, and the time threshold value (the predetermined time) is indicated as ΔT. In FIG. 7, the determined shooting state is indicated under the waveform.

First of all, a vibration which is not less than the first threshold value V1 is detected at the time T1, and then a vibration which is not more than the second threshold value −V1 (not less than the absolute value of the second threshold value) having an opposite sign is detected at the time T2. Since the time period from the time T1 to the time T2 is within the time threshold value ΔT, it is determined that the state is in shooting while walking. Then, as described with reference to FIG. 6, the amplitude of the vibration is temporarily reduced by the unconscious behavior of the user. However, in the present embodiment, the third threshold value V2 is set to be a value smaller than the first threshold value V1. Therefore, a vibration that is not less than the third threshold value V2 can be detected at the time T6, and it is continuously determined that the state is in shooting while walking even when the amount of the vibration is reduced. Thus, according to the determination method of the present embodiment, an image blur correction control in shooting while walking can be continuously maintained with high accuracy even when the user unconsciously behaves so as to absorb the hand shake.

In the present embodiment, the shooting state determining portion 135a determines that the first shooting state has started when the angular velocity exceeds the first threshold value and also it exceeds the second threshold value that has an opposite sign of the first threshold value within the predetermined time after it exceeds the first threshold value. Furthermore, the shooting state determining portion 135a determines that the first shooting state is continuously maintained when the angular velocity signal exceeds the third threshold value that is smaller than the first threshold value and also it exceeds the fourth threshold value that has an opposite sign of the third threshold value and that is smaller than the second value within the predetermined time after it exceeds the third threshold value on condition that the shooting state is the first shooting state. On the other hand, the shooting state determining portion 135a determines that the first shooting state is ended when the angular velocity signal does not exceed the third threshold value or it does not exceed the fourth threshold value within the predetermined time after it exceeds the third threshold value on condition that the shooting state is the first shooting state.

As described above, according to the present embodiment, the shooting state can be recognized with high accuracy and an image blur correction control that is optimized for each of the shooting states can be performed. In particular, even when a user unconsciously behaves so as to absorb a hand shake in shooting while walking, the determinations of the start of shooting while waking and the end of shooting while walking can be continuously performed.

Second Embodiment

Next, an image blur correction apparatus in a second embodiment of the present invention will be described. The present embodiment is different from the first embodiment only in the methods of determining the start of shooting while walking and the end of shooting while walking by the shooting state determining portion 135a. Other configurations of the present embodiment are similar to those of the first embodiment, and therefore, descriptions thereof are omitted.

Figure 8:
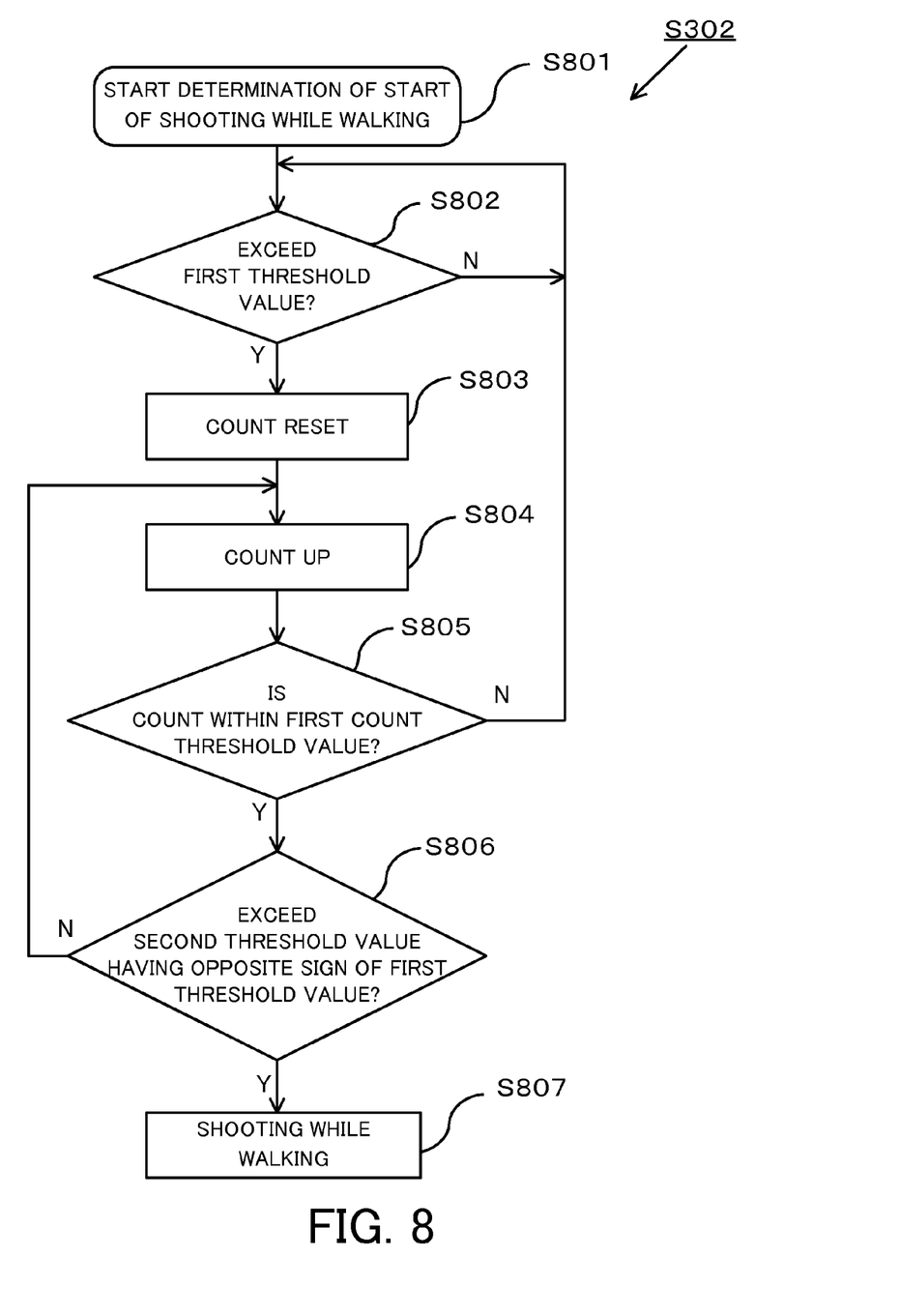
FIG. 8 is a flowchart of determining start of shooting while walking in the second embodiment.

First of all, referring to FIG. 8, a flow of determining the start of shooting while walking in the present embodiment is described in detail. FIG. 8 is a flowchart of the determination of the start of shooting while walking in the present embodiment. The determination of the start of shooting while walking illustrated in FIG. 8 corresponds to Step S302 of FIG. 3, which is performed by the shooting state determining portion 135a.

When the determination of the start of shooting while walking is started in Step S801, it is determined whether the angular velocity signal exceeds the first threshold value (the absolute value) in Step S802. This determination process is repeated until the angular velocity signal exceeds the first threshold value. When it is determined that the angular velocity signal exceeds the first threshold value, the count reset and the count up are performed in Steps S803 and S804, respectively. Subsequently, it is determined whether the count is within the first count threshold value (within the first time after the angular velocity signal exceeds the first threshold value) in Step S805. When the count is within the first count threshold value, the flow proceeds to Step S806.

In Step S806, it is determined whether the angular velocity signal exceeds the second threshold value (the absolute value) that has an opposite sign of the first threshold value. The absolute values of the first threshold value and the second threshold value may be equal to each other, or alternatively they may be different from each other. When the angular velocity signal does not exceed the second threshold value (the absolute value) in Step S806, a loop of Steps S804, S805, and S806 is repeated. On the other hand, the angular velocity signal exceeds the second threshold value in Step S806, it is determined that the current shooting state is the state of shooting while walking in Step S807. When the count exceeds the first count threshold value during the loop of Steps S804 to S806 (in Step S805), the flow returns to Step S802.

Figure 9:
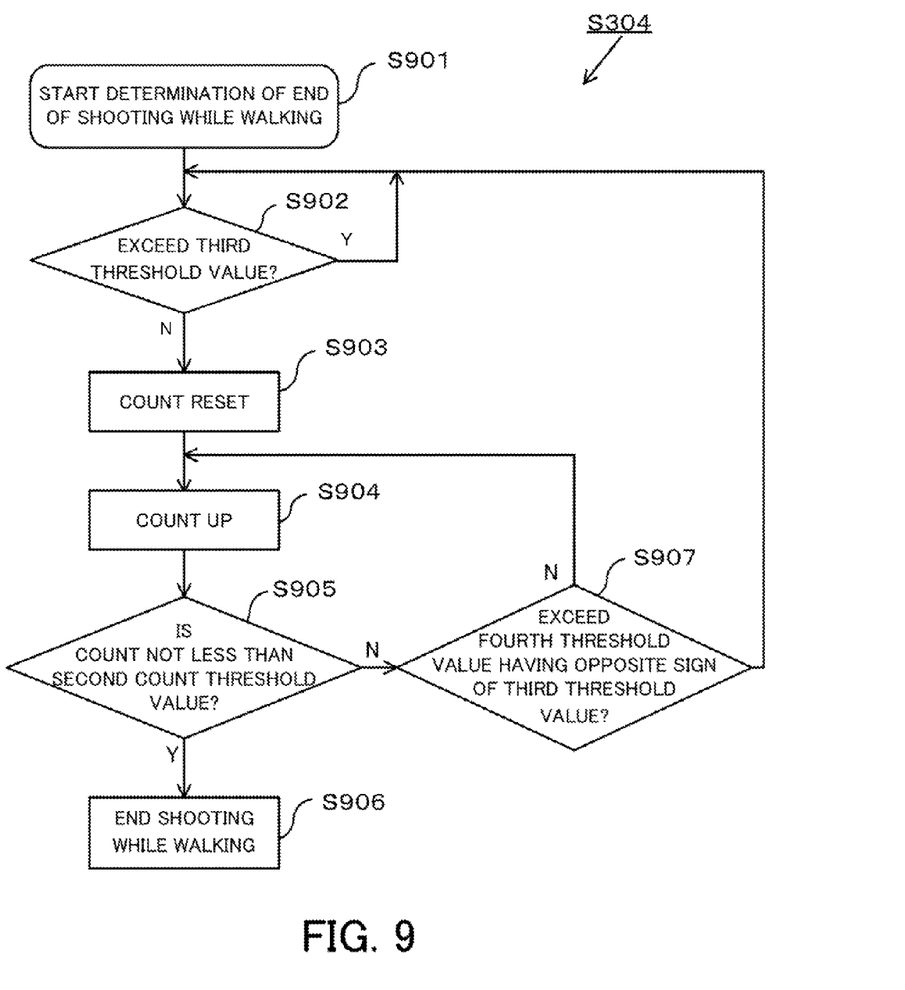
FIG. 9 is a flowchart of determining end of shooting while walking in the second embodiment.

Next, referring to FIG. 9, a flow of determining the end of shooting while walking in the present embodiment is described in detail. FIG. 9 is a flowchart of the determination of end of shooting while walking in the present embodiment. The determination of end of shooting while walking illustrated in FIG. 9 corresponds to Step S304 of FIG. 3, which is performed by the shooting state determining portion 135a.

In the state of shooting while walking, when the determination of the end of shooting while walking is started in Step S901, it is determined whether the angular velocity signal exceeds the third threshold value in Step S902. In the present embodiment, the third threshold value (the absolute value) is a value equal to the first threshold value (the absolute value) that is used for the determination of the start of shooting while walking, or alternatively the third threshold value may be set to a value smaller than the first threshold value. This determination process is repeated (Y in Step S902) until the angular velocity signal does not exceed the third threshold value (N in Step S902). When the angular velocity signal does not exceed the third threshold value, the flow proceeds to Step S903, where the count reset and the count up are performed in Steps S903 and S904, respectively. Subsequently, it is determined whether the count is not less than a second count threshold value (not less than a second predetermined time 2ΔT after the angular velocity signal does not exceed the third threshold value) in Step S905. In the present embodiment, the second predetermined time is set to be a time that is longer than the first predetermined time.

When the count is within the second count threshold value (within the second predetermined time after the angular velocity signal exceeds the third threshold value) in Step S905, a loop of Steps S907, S904, and S905 is repeated until the angular velocity signal is determined to exceed a fourth threshold value (an absolute value) of an opposite sign of the third threshold value in Step S907. On the other hand, when the count is not less than the second count threshold value in Step S905, the flow proceeds to Step S906, where it is determined that the shooting while walking is ended. When it is determined that the angular velocity signal exceeds the fourth threshold value (the absolute value) of an opposite sign of the third threshold value in Step S907 during the loop of Steps S907, S904, and S905, the flow returns to Step S902. In the present embodiment, the fourth threshold value is set to be a value equal to the second threshold value, but the present embodiment is not limited to this and the fourth threshold value may also be set to a value that is smaller than the second threshold value. The absolute values of the third threshold value and the fourth threshold value may be equal to each other, or alternatively they may be different from each other.

As described above, using the flows described with reference to FIGS. 8 and 9, the start of shooting while walking and the end of shooting while walking can be determined with high accuracy. In the present embodiment, a determination reference of the end of shooting while walking is set more strictly than a determination reference of the start of shooting while walking. Therefore, even when a user unconsciously behaves so as to absorb the hand shake, the determination of shooting while walking is not easily removed and a high accuracy control can be performed.

Figure 10:
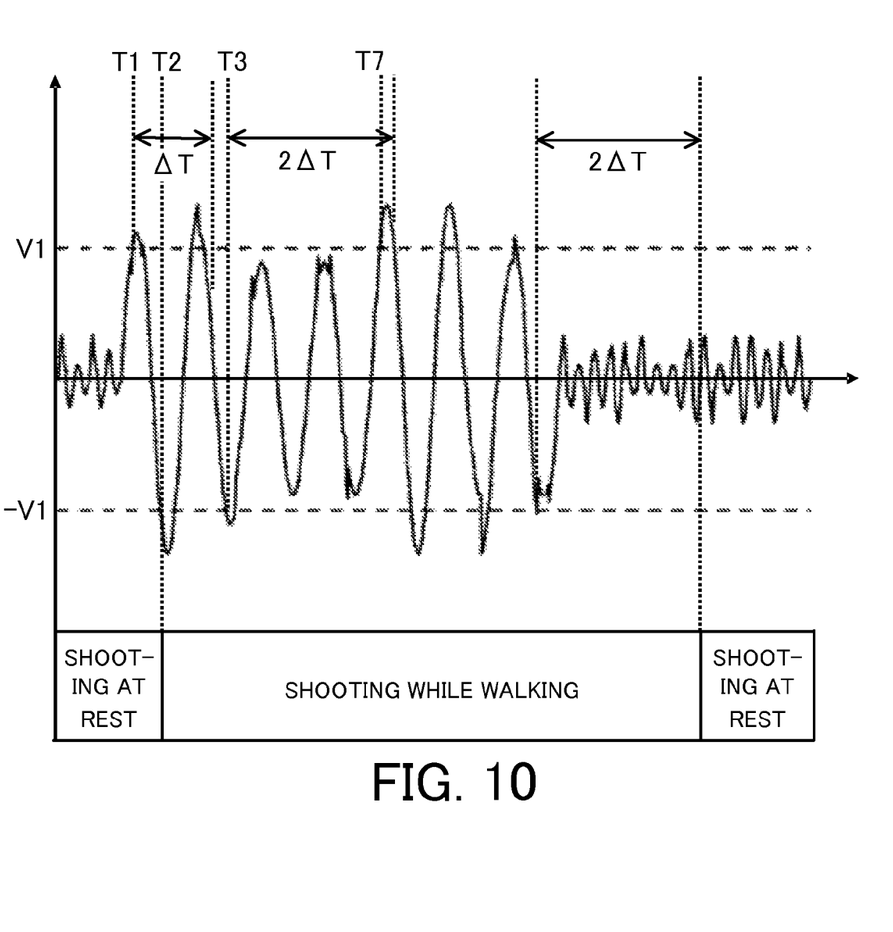
FIG. 10 is a vibration detection result in the second embodiment.

Next, referring to FIG. 10, in the present embodiment, a vibration detection result in a case where the time threshold value used for the determination of the end of shooting while walking is set to be longer than the time threshold value used for the determination of the start of shooting while walking will be described. FIG. 10 is a vibration detection result in the present embodiment. In FIG. 10, the second count threshold value (the second time) is set to be twice as large as the first count threshold value (the first time). However, the present embodiment is not limited to this, and it is enough that the second count threshold value is set to be larger than the first count threshold value (the second time is set to be longer than the first time). The waveform illustrated in FIG. 10 is the same as the waveform of FIGS. 6 and 7.

First of all, a vibration of the angular velocity signal which is not less than the first threshold value V1 is detected at the time T1, and a vibration which is not more than the second threshold value −V1 (not less than the absolute value of the second threshold value) is detected at the time T2. Then, the amplitude of the vibration is decreased by the unconscious behavior of the user, and for a while after detecting the vibration which is not more than the third threshold value −V1 (not less than the absolute value of the third threshold value) at the time T3, a vibration not less than the fourth threshold value V1 is not detected. In the present embodiment, however, the second time threshold value 2ΔT (the second time) used for the determination of the end of shooting while walking is set to be longer than the first time threshold value ΔT (the first time) used for the determination of the start of shooting while walking. Therefore, the vibration not less than the fourth threshold value V1 can be detected at the time T7 which is within the second time threshold value 2ΔT from the time T3, and the determination of shooting while walking is continuously maintained even when the amount of the vibration is reduced. In other words, adopting the detection method of the present embodiment, an image blur correction control in shooting while walking can be continuously performed even when the user unconsciously behaves so as to absorb the hand shake.

In the present embodiment, the shooting state determining portion 135a determines that the first shooting state has started when the angular velocity exceeds the first threshold value and also it exceeds the second threshold value that has an opposite sign of the first threshold value within the first time after it exceeds the first threshold value. Furthermore, the shooting state determining portion 135a determines that the first shooting state is continuously maintained when the angular velocity signal exceeds the third threshold value and also it exceeds the fourth threshold value that has an opposite sign of the third threshold value within the second time that is longer than the first time after the angular velocity signal exceeds the third threshold value on condition that the shooting state is the first shooting state. On the other hand, the shooting state determining portion 135a determines that the first shooting state is ended when the angular velocity signal does not exceed the third threshold value or it does not exceed the fourth threshold value within the second time after it exceeds the third threshold value on condition that the shooting state is the first shooting state.

As described above, according to the present embodiment, the shooting state can be recognized with high accuracy and an image blur correction control that is optimized for each of the shooting states can be performed. In particular, even when a user unconsciously behaves so as to absorb a hand shake in shooting while walking, the determinations of the start of shooting while waking and the end of shooting while walking can be continuously performed.

Each of the above embodiments is described on the assumption that the first shooting state is the state of shooting while walking, but is not limited to this. For example, each of the above embodiments can also be applied to a case where the first shooting state is a state of shooting on a vehicle. The determinations of the start and the end of the state of shooting while walking in each of the above embodiments may also use a time period from a time at which the angular velocity signal exceeds a threshold value more than once to a time at which it exceeds a threshold value having an opposite sign within a predetermined time. In such determination, a time from a peak of the angular velocity signal to a peak of the angular velocity signal having an opposite sign can also be used.

Using the integral characteristics that enlarge the lens driving range in shooting while walking, a large amount of the vibration (the image blur) in shooting while walking can also be sufficiently corrected, and furthermore the deterioration of the optical performance or the feeling of strangeness at the time of switching the control can be reduced since the lens driving range is not widened except for shooting while walking.

The angular velocity signal after passing through the high-pass filter is used for the determination of shooting state, but the present embodiment is not limited to this and another signal may also be used if it is a signal that represents the characteristics of the vibration. For example, angular velocity information before passing through the high-pass filter or angular displacement information after passing through the integral filter may also be used to determine the shooting state.

With regard to the determination of the start of shooting while walking and the determination of the end of shooting while walking, the threshold values of the angular velocity signal for both the determinations are different from each other in the first embodiment, and the time threshold values for both the determinations are different from each other in the second embodiment, and the determination accuracy can be improved if these are combined so as to perform the determination.

In the present embodiment, as characteristics of changing in order to enlarge the correction range (characteristics depending on the determination result of the shooting state determining portion), the integral characteristics of the integral filter are used, but the present embodiment is not limited to this. For example, as the characteristics, a maximum value of an angular signal (the angular velocity signal) may also be used. Alternatively, a maximum value of a moving amount signal by which a lens is actually driven, which is generated based on the angular signal, can also be used.

As described above, in the present embodiment, a threshold value used for determining the start of shooting while walking is set to be larger than a threshold value used for determining the end of shooting while walking. Therefore, a determination requirement of the end of shooting while walking is stricter than a determination requirement of the start of shooting while walking. Therefore, according to each of the above embodiments, in an image blur correction apparatus that performs an image blur correction using characteristics depending on a shooting state, the image blur correction apparatus that improves detection accuracy of the shooting state can be provided. An optical apparatus that includes the image blur correction apparatus can also be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-225422, filed on Oct. 13, 2011, which is hereby incorporated by reference herein in its entirety.

What is claimed is:

1. An image blur correction apparatus comprising:
   a microcomputer configured to execute:
      a shooting state determining task that determines a shooting state of one of a first shooting state or a second shooting state based on an angular velocity signal;
      an image blur correction task that performs an image blur correction using characteristics depending on a determination result of the shooting state determining task;
      a first shooting start state determining task that determines that the first shooting state has started:
         when, within a first predetermined period after the angular velocity signal exceeds a first positive threshold value, the angular velocity signal falls below a second negative threshold value; and
      a first shooting end state determining task that determines, while in the first shooting state, that the first shooting state has ended:
         when, during a second predetermined period after the angular velocity signal does not exceed a third positive threshold value, the angular velocity signal does not fall below a fourth negative threshold value for an entire time of the second predetermined period, and
         wherein the third positive threshold value is smaller than the first positive threshold and the absolute value of the fourth negative threshold value is smaller than the absolute value of the second negative threshold value.

2. The image blur correction apparatus according to claim 1, wherein the image blur correction task performs the image blur correction using the characteristics in the second shooting state when the first shooting end state determining task determines that the first shooting start has ended.

3. The image blur correction apparatus according to claim 1, further comprising:
   an integral filter configured to convert the angular velocity signal into an angular displacement signal,
   wherein the characteristics are integral characteristics of the integral filter, and
   wherein the integral characteristics are switched to widen a range of the image blur correction in the first shooting state compared to the second shooting state.

4. The image blur correction apparatus according to claim 1, wherein the first shooting state is a state of shooting while walking, and the second shooting state is a state of shooting at rest.

5. The image blur correction apparatus according to claim 1, wherein the first shooting state is a state of shooting on a vehicle, and the second shooting state is a state of shooting at rest.

6. An optical apparatus comprising:
   an image blur correction apparatus; and
   an image stabilizing lens configured to be driven by the image blur correction apparatus,
   wherein the image blur correction apparatus comprises:
   a microcomputer configured to execute:
      a shooting state determining task that determines a shooting state of one of a first shooting state or a second shooting state based on an angular velocity signal;
      an image blur correction task that performs an image blur correction using characteristics depending on a determination result of the shooting state determining task;
      a first shooting start state determining task that determines that the first shooting state has started:
         when, within a first predetermined period after the angular velocity signal exceeds a first positive threshold value, the angular velocity signal falls below a second negative threshold value; and
      a first shooting end state determining task that determines, while in the first shooting state, that the first shooting state has ended:
         when, during a second predetermined period after the angular velocity signal does not exceed a third positive threshold value, the angular velocity signal does not fall below a fourth negative threshold value for an entire time of the second predetermined period, and
         wherein the third positive threshold value is smaller than the first positive threshold and the absolute value of the fourth negative threshold value is smaller than the absolute value of the second negative threshold value.

7. An image blur correction method comprising:
   a shooting state determining step of determining a shooting state of one of a first shooting state or a second shooting state based on an angular velocity signal;
   an image blur correction step of performing an image blur correction using characteristics depending on a determination result of the shooting state determining step;
   a first shooting start state determining step of determining that the first shooting state has started:
      when, within a first predetermined period after the angular velocity signal exceeds a first positive threshold value, the angular velocity signal falls below a second negative threshold value; and a first shooting end state determining step of determining, while in the first shooting state, that the first shooting state has ended:

when, during a second predetermined period after the angular velocity signal does not exceed a third positive threshold value, the angular velocity signal does not fall below a fourth negative threshold value for an entire time of the second predetermined period, and wherein the third positive threshold value is smaller than the first positive threshold and the absolute value of the fourth negative threshold value is smaller than the absolute value of the second negative threshold value.

\* \* \* \* \*